United States Patent
Ahn et al.

(10) Patent No.: US 7,787,680 B2
(45) Date of Patent: Aug. 31, 2010

(54) SYSTEM AND METHOD FOR PROCESSING AN IMAGE

(75) Inventors: Chi Young Ahn, Seoul (KR); Young Seuk Song, Seoul (KR); Do Young Choi, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 844 days.

(21) Appl. No.: 11/684,234

(22) Filed: Mar. 9, 2007

(65) Prior Publication Data

US 2007/0236492 A1    Oct. 11, 2007

(30) Foreign Application Priority Data

Mar. 10, 2006   (KR) .................... 10-2006-0022504

(51) Int. Cl.
*G06K 9/00*   (2006.01)
(52) U.S. Cl. .................... 382/128; 600/437; 600/443
(58) Field of Classification Search .............. 382/128; 600/437, 443
See application file for complete search history.

(56) References Cited

U.S. PATENT DOCUMENTS

| | | | |
|---|---|---|---|
| 6,102,859 A | | 8/2000 | Mo |
| 6,224,552 B1 * | | 5/2001 | Jago et al. .................... 600/437 |
| 6,666,824 B2 * | | 12/2003 | Rust et al. .................... 600/443 |
| 6,743,174 B2 * | | 6/2004 | Ng et al. .................... 600/437 |
| 7,645,236 B2 * | | 1/2010 | Simopoulos et al. ........ 600/437 |

FOREIGN PATENT DOCUMENTS

| | | |
|---|---|---|
| JP | 6-133967 | 5/1994 |
| JP | 2000-139914 | 5/2000 |
| JP | 2006-20777 | 1/2006 |

OTHER PUBLICATIONS

U.S. Appl. No. 12/051,325, filed Mar. 19, 2008, Choi.

* cited by examiner

*Primary Examiner*—Tom Y Lu
(74) *Attorney, Agent, or Firm*—Oblon, Spivak, McClelland, Maier & Neustadt, L.L.P.

(57) ABSTRACT

There is provided an image processing system, which includes: a volume data processor for forming volume data based on image signals and setting at least one frame in the volume data; an AGC/LGC parameter setting unit for setting axial gain compensation (AGC) and lateral gain compensation (LGC) parameters based on the frame; a gain parameter setting unit for setting a gain parameter based on the frame; an amplifying unit for performing AGC/LGC upon image signals based on the AGC/LGC parameters and amplifying the image signals based on the gain parameter; a brightness adjusting unit for analyzing intensities of pixels included in the volume data formed based on the image signal performing the AGC/LGC and adjusting the gain, and adjusting brightness of the volume data based on the analysis result; and an image processor for forming images based on the frame and the volume data.

18 Claims, 7 Drawing Sheets

SYSTEM AND METHOD FOR PROCESSING AN IMAGE

The present application claims priority from Korean Patent Application No. 10-2006-0022504 filed on Mar. 10, 2006, the entire subject matter of which is incorporated herein by reference.

BACKGROUND

1. Field

The present invention generally relates to image processing systems, and more particularly to an image processing system and a method for adjusting the brightness of images.

2. Background

Generally, an ultrasound diagnostic system has become an important and popular diagnostic tool due to its wide range of applications. Specifically, due to its non-invasive and non-destructive nature, the ultrasound diagnostic system has been extensively used in the medical profession. Modern high-performance ultrasound diagnostic systems and techniques are commonly used to produce two or three-dimensional (2D or 3D) diagnostic images of a target object. The ultrasound diagnostic system generally uses a probe including an array transducer having a plurality of transducer elements to transmit and receive ultrasound signals. The ultrasound diagnostic system forms an ultrasound image of the internal structures of the target object by electrically exciting the transducer elements to generate ultrasound pulses that travel into the target object. The ultrasound pulses produce ultrasound echoes since they are reflected from a discontinuous surface of acoustic impedance of the internal structure, which appears as discontinuities to the propagating ultrasound pulses. Various ultrasound echoes return to the array transducer and are converted into electrical signals, which are amplified and processed to produce ultrasound data for forming an image of the internal structure of the target object. The ultrasound diagnostic system is very important in the medical field since it provides physicians with real-time and high-resolution images of human internal features without the need for invasive observation techniques such as surgery.

In the ultrasound diagnostic system, an ultrasound image needs to be optimized to clearly show a desirable portion for accurate diagnosis. The ultrasound image can be optimized by slightly adjusting the image parameters related to the brightness of an ultrasound image such as an axial gain compensation (AGC) parameter, a lateral gain compensation (LGC) parameter, a gain parameter and a dynamic range (DR) parameter.

However, since the adjustment of the image parameters is carried out based on the frame data and the volume data for a 3-dimensional ultrasound image are obtained based on the frame data, it is difficult to optimally improve the quality of the 3-dimensional ultrasound image.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
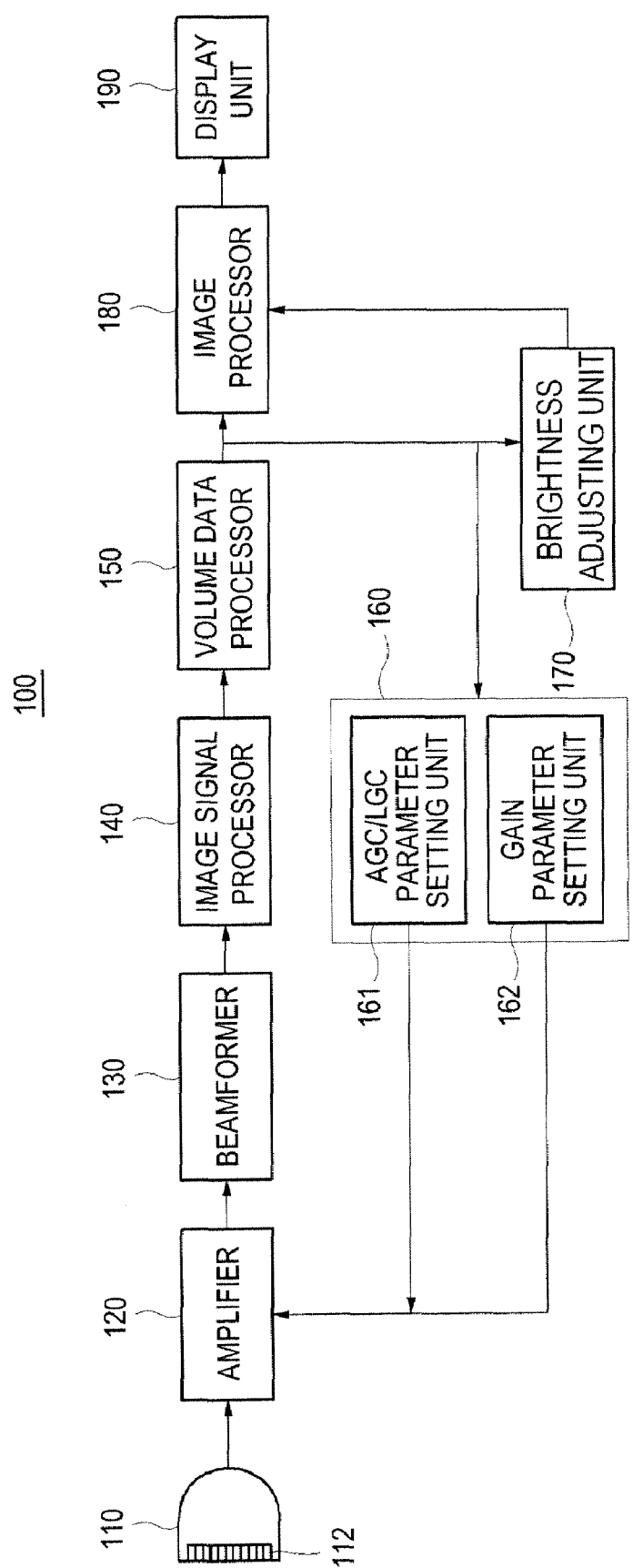
FIG. 1 is a block diagram showing an ultrasound diagnostic system constructed in accordance with the present invention.

One embodiment of the present invention will be described below with reference to FIGS. 1 to 7. FIG. 1 is a block diagram showing an ultrasound diagnostic system constructed in accordance with one embodiment of the present invention. As shown in FIG. 1, the ultrasound diagnostic system 100 includes a probe 110, an amplifier (AGC/LGC and gain controller) 120, a beamformer 130, an image signal processor 140, a volume data processor 150, an image parameter setting unit 160, a brightness adjusting unit 170, an image processor 180 and a display unit 190. Further, the image signal processor 140, the volume data processor 150, the image parameter setting unit 160, the brightness adjusting unit 170 and the image processor 180 may be provided as one processor.

The probe 110 includes a 1-dimensional or a 2-dimensional array transducer 112 including a plurality of transducer elements. The transmit signals, which are appropriately delayed in the beamformer 130 to form an ultrasound beam, are transmitted to the array transducer 112. Then, the focused ultrasound beam, which is produced in response to the transmit signals, is transmitted along a scan line set in a target object (not shown). The probe 110 receives ultrasound echo signals reflected from the target object and converts the ultrasound echo signals into electrical signals (hereinafter referred to as "receive signals"). The receive signals are transmitted to the amplifier 120.

The amplifier 120 adjusts the gains of the receive signals in axial and lateral directions for axial gain compensation (AGC) and lateral gain compensation (LGC), respectively. This is to compensate for the loss in amplitude due to attenuation according to AGC/LGC parameters provided from the image parameter setting unit 160. Further, the amplifier 120 amplifies the receive signals based on the gain parameter provided from the image parameter setting unit 160.

The beamformer 130 provides delays to transmit signals to be transmitted to the array transducer 112 included in the probe 110 such that the ultrasound signals outputted from the array transducer 112 are focused on a focal point. Further, the beamformer 120 focuses the receive signals, which are received from the array transducer 112 included in the probe 110, in consideration of the delays with which the echo signals are arrived at each transducer element. It then outputs a focused receive beam representing the energy level of the ultrasound echo signals reflected from the focal point.

The image signal processor 140 (e.g., a digital signal processor (DSP)) performs an envelope detection for detecting the intensities of the focused receive signals to form ultrasound image data. That is, the image signal processor 140 forms ultrasound image data based on the receive focused signals acquired from each focal point and position information of a plurality of focal points on each scan line. The ultrasound image data include the coordinate information of each focal point, the angle information of each scan line and the intensity information of the echo signals received at each focal point. The ultrasound image data may be 2D ultrasound data.

The volume data processor 150 forms the volume data based on the ultrasound image data formed by the image signal processor 140. The volume data processor 150 sets a specified number of frames in the volume data. The frames are used for setting the AGC/LGC and gain parameters to be applied to the ultrasound image data. For example, the volume data processor 150 forms the volume data 210 based on the ultrasound image data (shown in FIG. 4) and then sets the frames 221 to 223 in the volume data 210. In such a case, the number of frames may be one or more (i.e., not limited to three).

The image parameter setting unit 160 includes an AGC/LGC parameter setting unit 161 and a gain parameter setting unit 162. The AGC/LGC parameter setting unit 161 extracts the frames, which are set in the volume data by the volume data processor 150. Then, the AGC/LGC parameter setting unit 161 sets the optimized AGC/LGC parameters to perform AGC/LGC for the receive signals based on the characteristics of the extracted frames. That is, the AGC/LGC parameter setting unit 161 sets the optimized AGC/LGC parameters to be applied to the receive signals to compensate for the attenuation of the ultrasound echo signals in the axial and lateral directions. The function and operation of the AGC/LGC parameter setting unit 161 will be described in detail with reference to FIGS. 3 and 4.

The gain parameter setting unit 162 sets a gain parameter for controlling the gain of the ultrasound image data based on the characteristics of the frames extracted from the volume data. That is, the gain parameter setting unit 162 sets the gain parameter for adjusting the entire gain of the 2D ultrasound images. The function and operation of the gain parameter setting unit 162 will be described in detail with reference to FIG. 5.

The brightness adjusting unit 170 analyzes a histogram of volume data formed based on the ultrasound image data obtained by applying the optimized AGC/LGC and gain parameters to the receive signals, thereby detecting the characteristic value of pixel intensities. Then, the brightness adjusting unit 170 sets a dynamic range (DR) parameter for adjusting the brightness of the volume data based on the detected characteristic value of the pixel intensities. The characteristic value of the pixel intensities may include a mean value, a median value, a maximum value, a minimum value, a standard deviation and a variance of the pixel intensities. The function and operation of the brightness adjusting unit 170 will be described in detail with reference to FIGS. 6 and 7.

The image processor 180 forms the ultrasound images based on the volume data formed by the volume data processor 150. The image processor 180 includes a 2D image processor and a 3D image processor (not shown). The 2D image processor forms the 2D ultrasound images based on the frames set in the volume data by the volume data processor 150, wherein the planes were obtained by applying the optimized AGC/LGC and gain parameters to the receive signals. The 3D image processor forms a 3D ultrasound image based on the volume data, the brightness of which has been adjusted by the brightness adjusting unit 170. The ultrasound images provided from the image processor 180 are displayed in the display unit 190.

Figure 2:
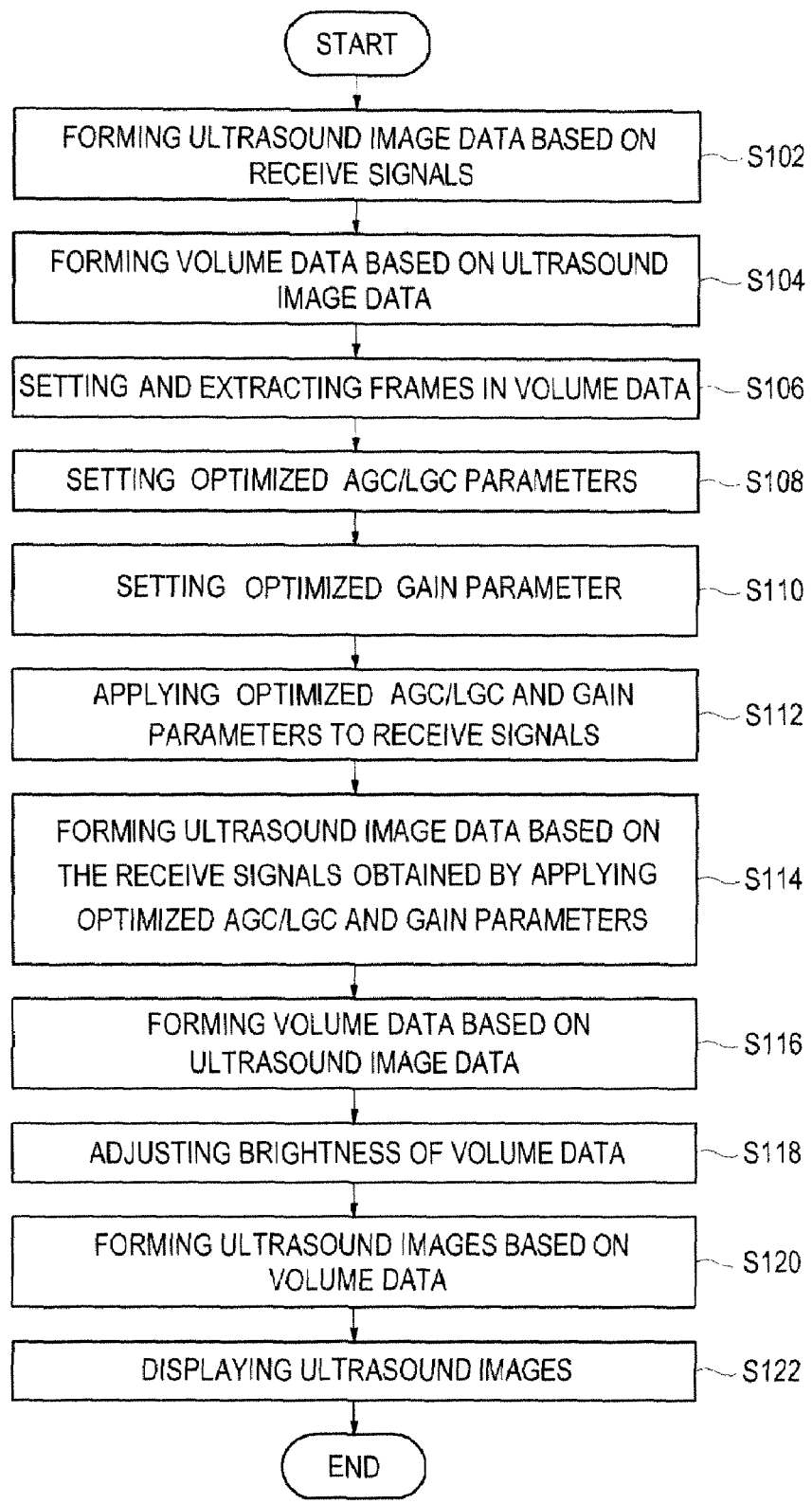
FIG. 2 is a flowchart showing a process of processing an ultrasound image in accordance with the present invention.

Hereinafter, a process of adjusting the brightness of ultrasound images will be described in detail with reference to FIGS. 2 to 7. FIG. 2 is a flowchart showing a process of processing an ultrasound image in accordance with one embodiment of the present invention.

As shown in FIG. 2, the image signal processor 140 forms the ultrasound image data based on the receive signals received from the probe 110 at step S102. The volume data processor 150 forms the volume data based on the ultrasound image data at step S104. The volume data processor sets a specified number of frames in the volume data and then extracts the frames set in the volume data at step S106.

The AGC/LGC parameter setting unit 161 sets optimized AGC/LGC parameters based on the characteristics of the extracted frames at step S108. The step S108 will be described in detail with reference to FIGS. 3 and 4. The gain parameter setting unit 162 sets an optimized gain parameter based on the characteristics of the extracted frames at step S110. The step S110 will be described in detail with reference to FIG. 5.

The amplifier 120 performs AGC/LGC upon the receive signals based on the optimized AGC/LGC parameters and then amplifies the receive signals based on the optimized gain parameter at step S112. The image signal processor 140 forms the ultrasound image data based on the receive signals obtained by applying the optimized AGC/LGC and gain parameters thereto at step S114. The volume data processor 150 forms the volume data based on the ultrasound image data at step S116.

The brightness adjusting unit 170 adjusts the brightness of the volume data at step S118. The step S118 will be described in detail with reference to FIG. 6. The image processor 180 forms the ultrasound images (i.e., 2D and 3D ultrasound images). The formed ultrasound images are displayed in the display unit 190 at step S122.

Figure 3:
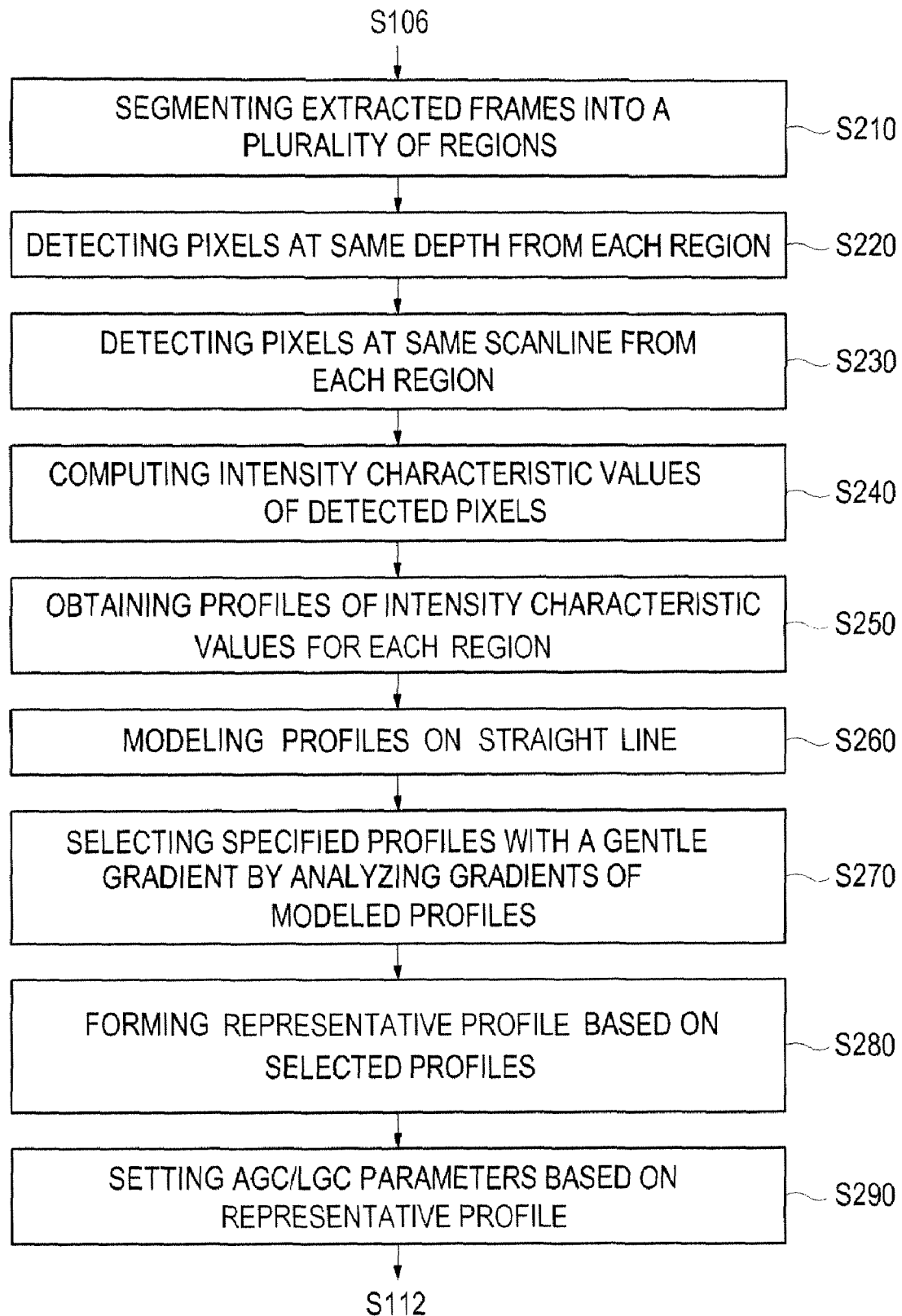
FIG. 3 is a flowchart showing a process of setting AGC/LGC parameters in accordance with the present invention.
Figure 4:
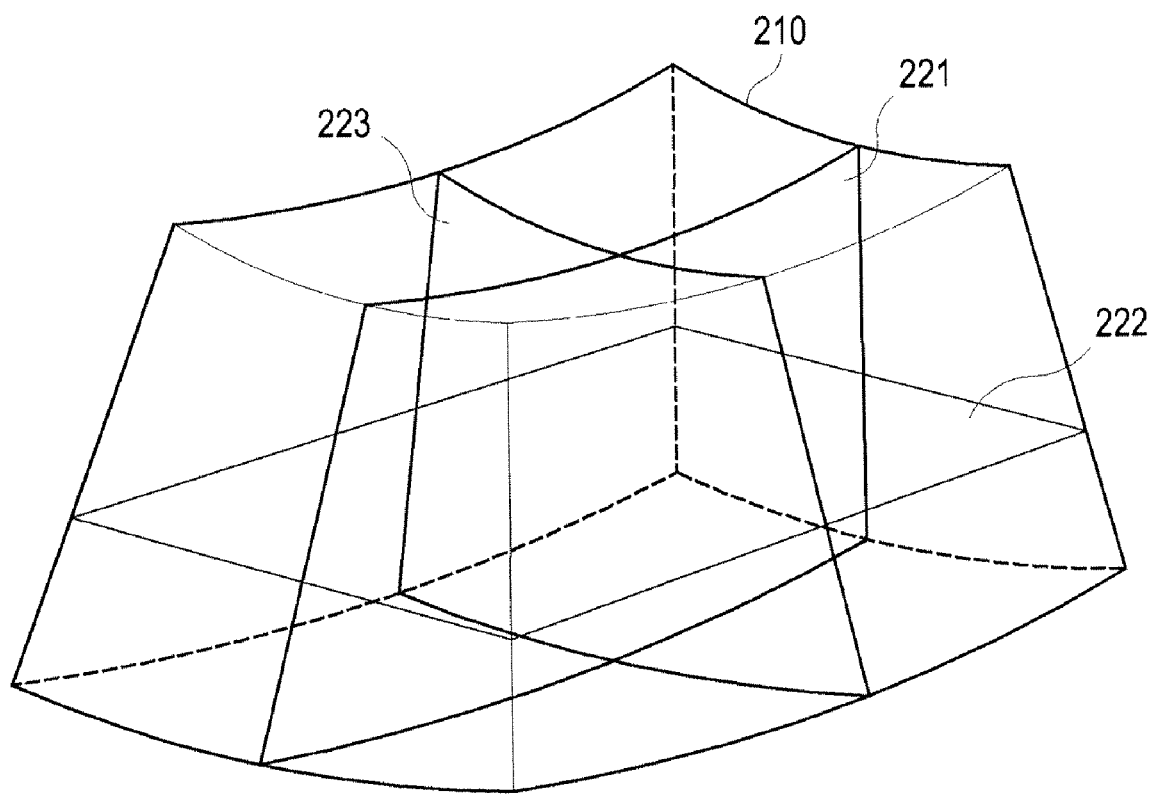
FIG. 4 is an exemplary diagram showing volume data and frames in accordance with one embodiment of the present invention.

Hereinafter, a process of setting AGC/LGC parameters will be described with reference to FIGS. 3 and 4. FIG. 3 is a flowchart showing a process of setting AGC/LGC parameters in accordance with one embodiment of the present invention. FIG. 4 is an exemplary diagram showing the volume data and frames set in the volume data in accordance with one embodiment of the present invention.

The AGC/LGC parameter setting unit 161 segments the frames 221 to 223 extracted from the volume data 210 into a plurality of regions, respectively, at step S210. In order to set the AGC parameter, the frames 221 to 223 are segmented in a vertical direction of the frames 221 to 223 displayed in the display unit 190. Further, in order to set the LCG parameter, the frames 221 to 223 are segmented in a horizontal direction of the frames 221 to 223 displayed in the display unit 190. The AGC/LGC parameter setting unit 161 detects the pixels at the same depth from each vertically-segmented region for setting an AGC parameter at step S220. Also, the AGC/LGC parameter setting unit 161 detects the pixels at the same scanline from each horizontally-segmented region for setting an LGC parameter (step S230).

The AGC/LGC parameter setting unit 161 computes the intensity characteristic values of the detected pixels at step S240. The intensity characteristic values may include a mean value, a median value, a maximum value, a minimum value, a standard deviation, a variance and the like of the detected pixel intensities. Then, the AGC/LGC parameter setting unit 161 obtains the profiles of the pixel intensities for respective regions based on the intensity characteristic values at step S250. The profiles include the vertical profiles for the AGC parameter and the horizontal profiles for the LGC parameter.

The AGC/LGC parameter setting unit 161 models the profiles in a straight line at step S260. Such modeling may be carried out by using a Least Squares Fit method. The AGC/LGC parameter setting unit 161 selects a specified number of profiles with a relatively gentle gradient by analyzing the gradients of the modeled profiles at step S270. The gradient of the modeled profile represents the brightness attenuation of the ultrasound image in a depth direction or a lateral direction. For example, the gradient of the profile is relatively steep in a dark region of the ultrasound image. Further, the gradient of the modeled horizontal profile represents the brightness of the pixels at the same depth in the ultrasound image. When the ultrasound image shows a heart in a lateral direction, there is a tendency that a central portion is bright and both end portions are dark. Therefore, the AGC/LGC parameter setting unit 161 selects a specified number of profiles with a gentle gradient in consideration of such characteristics.

The AGC/LGC parameter setting unit 161 forms representative vertical and horizontal profiles showing the brightness attenuation of the extracted frames based on the selected profiles at step S280. Specifically, the AGC/LGC parameter setting unit 161 calculates the mean gradient of the selected profiles, respectively, and sets the profiles having the mean gradient as representative profiles. Finally, the AGC/LGC parameter setting unit 161 sets the AGC/LGC parameters based on the representative profiles at step S290.

Figure 5:
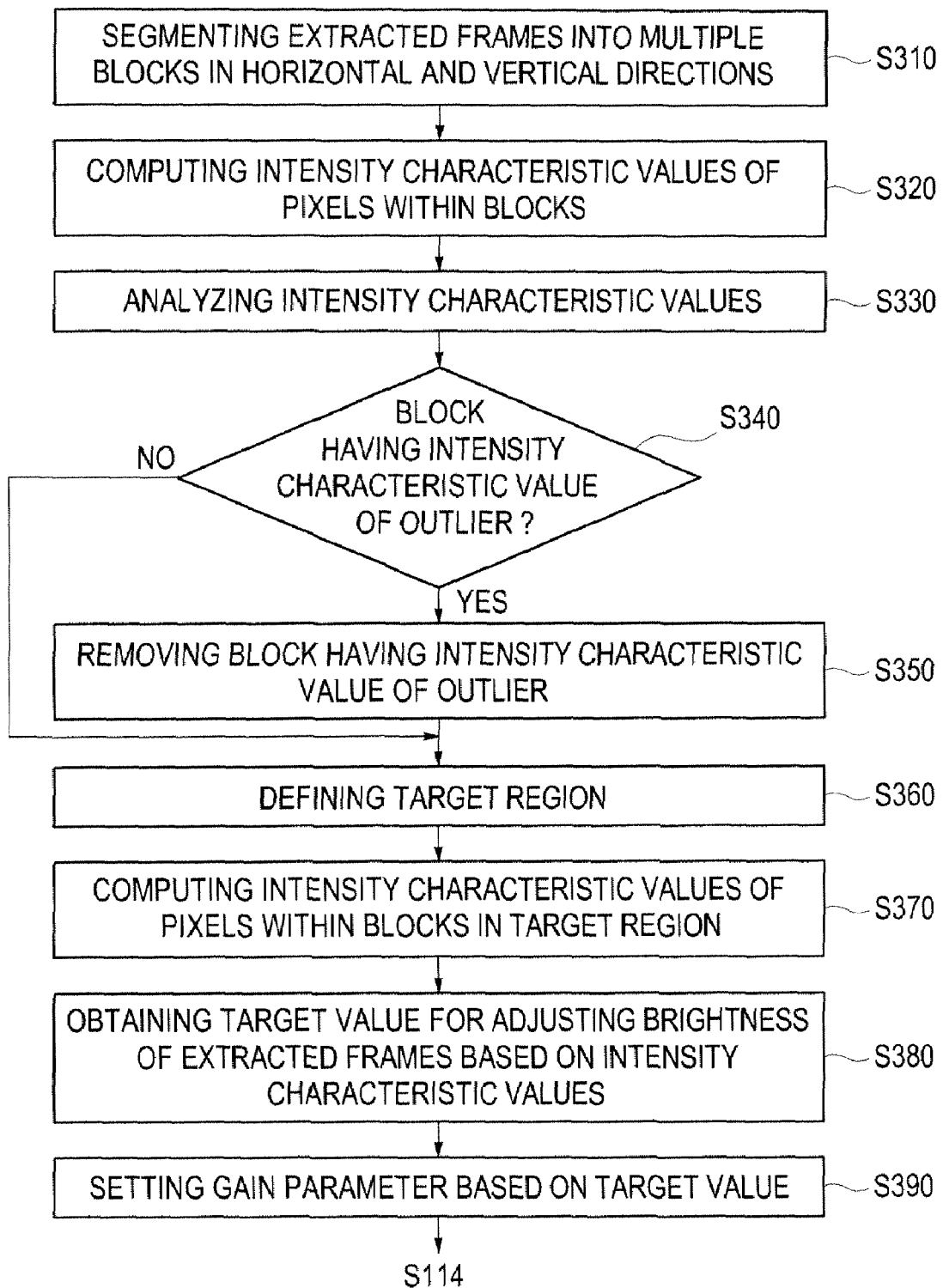
FIG. 5 is a flowchart showing a process of setting a gain parameter in accordance with the present invention.

Hereinafter, a process of setting a gain parameter in accordance with one embodiment of the present invention will be described in detail with reference to FIG. 5. FIG. 5 is a flowchart showing a process of setting a gain parameter in accordance with the embodiment of the present invention. As shown in FIG. 5, the gain processor 162 segments the extracted frames into multiple blocks in horizontal and vertical directions at step S310. It then computes the mean brightness of the pixels within each block, which represents the brightness characteristic of each block at step S320. Also, the median value, maximum value, minimum value, standard deviation and variance of brightness of pixels within each block may be computed instead of the mean brightness for representing the brightness characteristic of each block.

The gain parameter setting unit 162 analyzes the computed mean brightness at each block at step S330 and checks whether at least one block corresponding to outlier exists in the segmented blocks at step S340. If an arbitrary block has a mean brightness greater than a threshold, then the block is considered as the outlier representing a noise block. If it is determined that the block corresponding to the outlier exists in the segmented blocks at step S340, then the gain parameter setting unit 162 removes the block corresponding to the outlier at step S350.

Then, the gain parameter setting unit 162 defines a brightness range of the residual blocks except the removed block as a brightness range of typical soft tissues. On the other hand, if it is determined that there is no block corresponding to the outlier at step S340, then the gain parameter setting unit 162 defines a bright range of all blocks as a brightness range of typical soft tissues at step S360.

The gain parameter setting unit 162 computes the mean brightness of the entire blocks within the brightness range of the typical soft tissues at step S370. The gain parameter setting unit 162 compares the computed means brightness with a reference mean brightness, which is previously set and stored at step S380. Finally, the gain parameter setting unit 162 sets an optimized gain parameter based on the comparison result at step S390.

Figure 6:
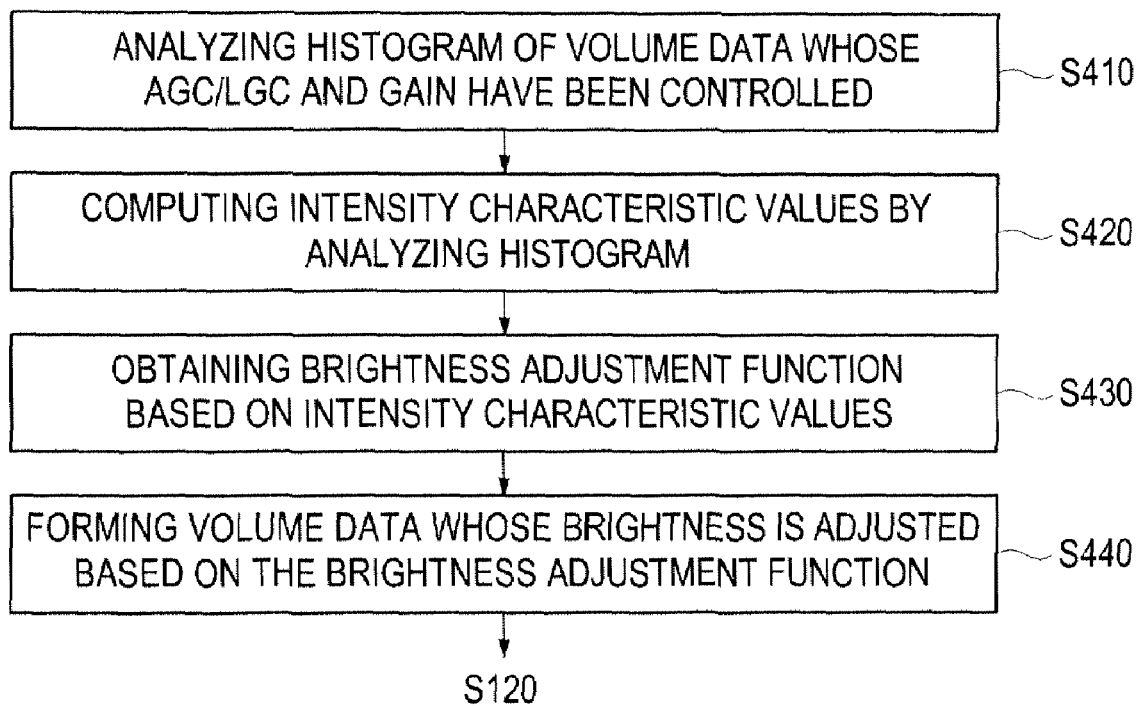
FIG. 6 is a flowchart showing a process of adjusting the brightness of the volume data in accordance with the present invention.
Figure 7:
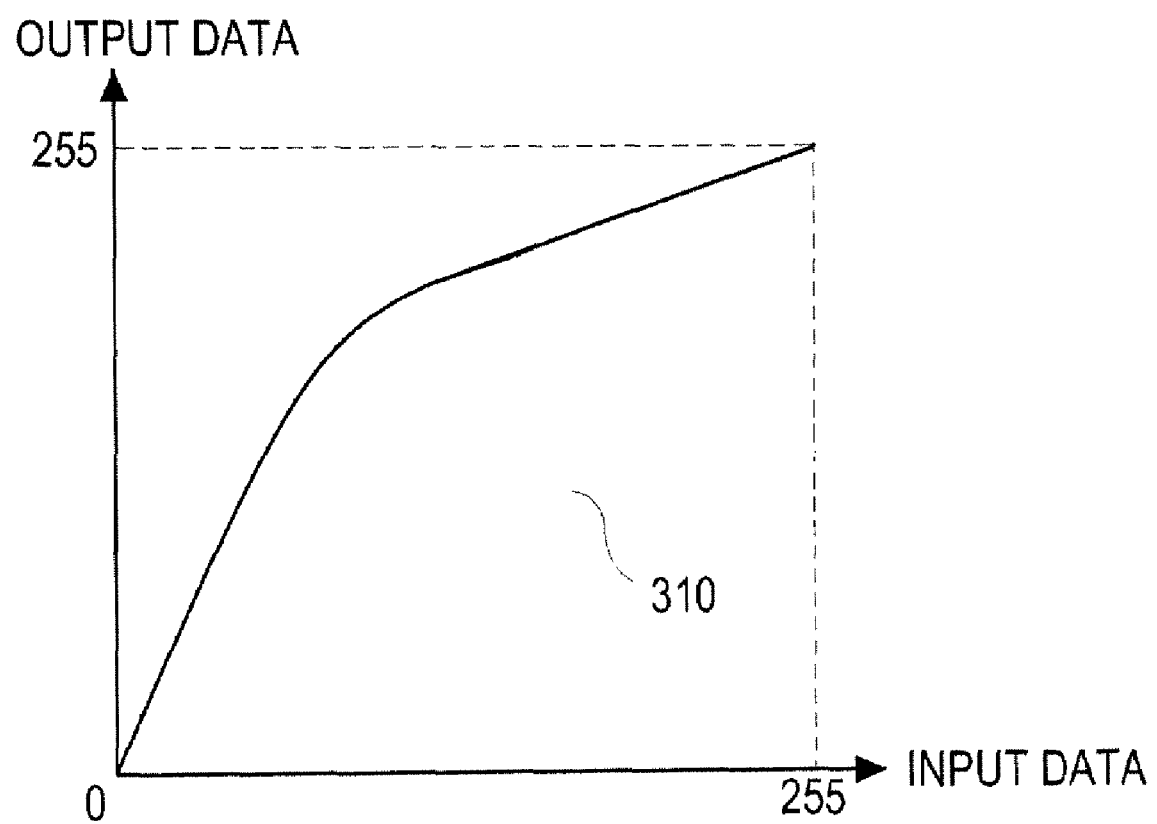
FIG. 7 shows an example of a brightness adjustment function in accordance with the present invention.

Hereinafter, a process of adjusting the brightness of volume data in accordance with one embodiment of the present invention will be described in detail with reference to FIGS. 6 and 7. FIG. 6 is a flowchart showing a process of adjusting the brightness of volume data in accordance with one embodiment of the present invention. FIG. 7 illustrates a brightness adjustment function in accordance with one embodiment of the present invention.

As shown in FIG. 6, the brightness adjusting unit 170 analyzes a histogram of the volume data at step S410. Also, in accordance with another embodiment of the present invention, the brightness adjusting unit 170 may analyze a histogram of a frame extracted from the volume data instead of analyzing the histogram of the volume data for reducing an analysis time.

The brightness adjusting unit 170 analyzes the histogram of the volume data, thereby obtaining the intensity characteristic values at step S420. Specially, the brightness adjusting unit 170 obtains the maximum intensity of pixels in the volume data as an intensity characteristic value. As shown in FIG. 7, the brightness adjusting unit 170 obtains a brightness adjustment function 310 for adjusting the brightness of the volume data based on the maximum intensity of the pixels at step S430. The brightness adjustment function 310 may be defined as the following equation (1):

$$\text{Output} = \text{Input}^{1/\gamma}, \gamma = \log(\text{max intensity})/\log(\text{ideal max intensity}) \quad (1)$$

wherein Input represents the intensities of pixels included in the input volume data, max intensity represents the maximum intensity of pixels in the volume data, and ideal max intensity represents the maximum intensity of pixels in the volume data obtained by applying optimized image parameters. The ideal max intensity is previously calculated and stored in accordance with the present invention. The brightness adjusting unit 170 adjusts the brightness of the volume data based on the brightness adjustment function 310 at step S440.

In accordance with the present invention, since the AGC/LGC and gain parameters are set based on the frames extracted from the volume data, the image quality of the 3-dimensional ultrasound image can be substantially improved. Also, the brightness of the volume data is adjusted in accordance with the present invention and the brightness of the 3D ultrasound image can be adjusted more accurately. Thus, the user can make a diagnosis more accurately and easily.

An embodiment may be achieved in whole or in part by an image processing system, which includes: a volume data processor for forming volume data based on image signals and setting at least one frame in the volume data; an AGC/LGC parameter setting unit for setting axial gain compensation (AGC) and lateral gain compensation (LGC) parameters based on the frame; a gain parameter setting unit for setting a gain parameter based on the frame; an amplifying unit for performing AGC/LGC upon image signals based on the AGC/LGC parameters and amplifying the image signals based on the gain parameter to provide amplified image signals; a brightness adjusting unit for analyzing intensities of pixels included in the volume data formed based on the amplified image signals and based thereupon, adjusting brightness of the volume data based on the analysis result; and an image processor for forming images based on the frame and the brightness-adjusted volume data.

In accordance with another embodiment of the present invention, there is provided an image processing method, comprising: a) forming volume data based on image signals;

b) setting at least one frame in the volume data and extracting the frame; c) setting axial gain compensation (AGC) and lateral gain compensation (LGC) parameters based on the extracted frame; d) setting a gain parameter based on the extracted frame; e) performing AGC/LGC upon image signals based on the AGC/LGC parameters and amplifying the image signals based on the gain parameter to provide amplified image signals; f) forming volume data based on the amplified image signal; g) computing an intensity characteristic value of the volume data and adjusting brightness of the volume data based on the computed intensity characteristic value; and h) forming images based on the frame and the brightness-adjusted volume data.

Any reference in this specification to "one embodiment," "an embodiment," "example embodiment," etc. means that a particular feature, structure or characteristic described in connection with the embodiment is included in at least one embodiment of the invention. The appearances of such phrases in various places in the specification are not necessarily all referring to the same embodiment. Further, when a particular feature, structure or characteristic is described in connection with any embodiment, it falls within the purview of one skilled in the art to effectuate such a feature, structure or characteristic in connection with other ones of the embodiments.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, drawings and appended claims. In addition to such variations and modifications in the component parts and/or arrangements, alternative uses will also be apparent to those skilled in the art.

What is claimed is:

1. An image processing system, comprising:
    a volume data processor for forming volume data based on image signals and setting at least one frame in the volume data;
    an AGC/LGC parameter setting unit for setting axial gain compensation (AGC) and lateral gain compensation (LGC) parameters based on the frame;
    a gain parameter setting unit for setting a gain parameter based on the frame;
    an amplifying unit for performing AGC/LGC upon image signals based on the AGC/LGC parameters and amplifying the image signals based on the gain parameter to provide amplified image signals;
    a brightness adjusting unit for analyzing intensities of pixels included in the volume data formed based on the amplified image signals and based thereupon, adjusting brightness of the volume data based on the analysis result; and
    an image processor for forming images based on the frame and the brightness-adjusted volume data.

2. The image processing system of claim 1, wherein the image signals are ultrasound image signals.

3. The image processing system of claim 1, wherein the AGC/LGC parameter setting unit operates to:
    segment the frame set in the volume data into a plurality of regions in a specified direction;
    compute intensity characteristic values of pixels at the same depth detected from each region;
    obtain vertical profiles of the intensity characteristic values in each region and modeling the vertical profiles in a straight line;
    select a predetermined number of vertical profiles having a relatively gentle gradient;
    form a representative profile based on the selected vertical profiles; and
    set the AGC parameter based on the representative profile.

4. The image processing system of claim 3, wherein the AGC/LGC parameter setting unit forms the representative profile to have a mean gradient of the selected vertical profiles.

5. The image processing system of claim 1, wherein the AGC/LGC parameter setting unit operates to:
    segment the frame set in the volume data into a plurality of regions in a specified direction;
    compute intensity characteristic values of pixels at the same scanline detected from each region;
    obtain horizontal profiles of the intensity characteristic values in each region and modeling the horizontal profiles in a straight line;
    select a predetermined number of horizontal profiles having a relatively gentle gradient;
    form a representative profile based on the selected horizontal profiles; and
    set the LGC parameter based on the representative curve.

6. The image processing system of claim 5, wherein the AGC/LGC parameter setting unit forms the representative profile to have a mean gradient of the selected horizontal profiles.

7. The image processing system of claim 1, wherein the gain parameter setting unit operates to:
    segment the frame into multiple blocks in horizontal and vertical directions and computing mean brightness of pixels in each block;
    remove blocks having the mean brightness greater than a threshold and defining a brightness range of residual blocks as a brightness range of a target object;
    compute a mean value of the mean brightness of each block;
    compare the mean value with a reference value; and
    set the gain parameter based on the comparison result.

8. The image processing system of claim 1, wherein the brightness adjusting unit operates to:
    analyze a histogram of the volume data to obtain an intensity characteristic value of the volume data;
    compare the intensity characteristic value with a reference value;
    obtain a brightness adjustment function based on the comparison result; and
    adjust brightness of the volume data based on the brightness adjustment function.

9. The image processing system of claim 1, wherein the image processor forms a 2D image based on the frame and a 3D image based on the volume data.

10. A method of processing an image, comprising:
    a) forming volume data based on image signals;
    b) setting at least one frame in the volume data and extracting the frame;
    c) setting axial gain compensation (AGC) and lateral gain compensation (LGC) parameters based on the extracted frame;
    d) setting a gain parameter based on the extracted frame;
    e) performing AGC/LGC upon image signals based on the AGC/LGC parameters and amplifying the image signals based on the gain parameter to provided amplified image signals;

f) forming volume data based on the amplified image signal;

g) computing an intensity characteristic value of the volume data and adjusting brightness of the volume data based on the computed intensity characteristic value; and h) forming images based on the frame and the brightness-adjusted volume data.

11. The method of claim 10, wherein the image signals are ultrasound image signals.

12. The method of claim 10, wherein the step c) includes:

c11) segmenting the frame set in the volume data into a plurality of regions in a specified direction;

c12) computing intensity characteristic values of pixels at the same depth detected from each region;

c13) obtaining vertical profiles of the intensity characteristic values in each region and modeling the vertical profiles in a straight line;

c14) selecting a predetermined number of vertical profiles having a relatively gentle gradient;

c15) forming a representative profile based on the selected vertical profiles; and c16) setting the AGC parameter based on the representative profile.

13. The method of claim 12, wherein the step c15) includes:

computing a mean gradient value of the selected vertical profiles;

forming the representative profile having the mean gradient.

14. The method of claim 10, wherein the step c) includes:

c21) segmenting the frame set in the volume data into a plurality of regions in a specified direction;

c22) computing intensity characteristic values of pixels at the same scanline detected from each region;

c23) obtaining horizontal profiles of the intensity characteristic values in each region and modeling the horizontal profiles in a straight line;

c24) selecting a predetermined number of horizontal profiles having a relatively gentle gradient;

c25) forming a representative profile based on the selected horizontal profiles; and c26) setting the LGC parameter based on the representative curve.

15. The method of claim 14, wherein the step c25) includes:

computing a mean gradient value of the selected horizontal profiles;

forming the representative profile having the mean gradient.

16. The method of claim 10, wherein the step d) includes:

d1) segmenting the frame into multiple blocks in horizontal and vertical directions and computing mean brightness of pixels in each block;

d2) removing blocks having the mean brightness greater than a threshold and defining a brightness range of residual blocks as a brightness range of a target object;

d3) computing a mean value of the mean brightness of each block;

d4) comparing the mean value with a reference value; and d5) setting the gain parameter based on the comparison result.

17. The method of claim 10, wherein the step g) includes:

g1) analyzing a histogram of the volume data to obtain an intensity characteristic value of the volume data;

g2) comparing the intensity characteristic value with a reference value;

g3) obtaining a brightness adjustment function based on the comparison result; and g4) adjusting brightness of the volume data based on the brightness adjustment function.

18. The method of claim 10, wherein the step h) includes:

h1) forming a 2D image based on the frame; and h2) forming a 3D image based on the volume data.

* * * * *